(12) United States Patent
Reierson et al.

(10) Patent No.: US 9,003,543 B2
(45) Date of Patent: Apr. 7, 2015

(54) PROVIDING A SECURITY BOUNDARY

(75) Inventors: Kristofer Hellick Reierson, Acton, MA (US); Lidiane Pereira de Souza, Middleton, MA (US); Angela Mele Anderson, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 12/973,907

(22) Filed: Dec. 21, 2010

(65) Prior Publication Data

US 2012/0159570 A1 Jun. 21, 2012

(51) Int. Cl.
*G06F 7/04* (2006.01)
*G06F 21/74* (2013.01)
*G06F 21/53* (2013.01)
*G06F 21/60* (2013.01)

(52) U.S. Cl.
CPC ............... *G06F 21/74* (2013.01); *G06F 21/53* (2013.01); *G06F 21/604* (2013.01); *G06F 2221/2141* (2013.01)

(58) Field of Classification Search
CPC ........................ G06F 21/10; G11B 20/00086
USPC ....................................................... 726/26–30
See application file for complete search history.

(56) References Cited

U.S. PATENT DOCUMENTS

| | | | |
|---|---|---|---|
| 5,974,549 A * | 10/1999 | Golan | 726/23 |
| 6,711,686 B1 * | 3/2004 | Barrett | 709/221 |
| 6,763,370 B1 | 7/2004 | Schmeidler et al. | |
| 6,938,096 B1 | 8/2005 | Greschler et al. | |
| 7,017,188 B1 | 3/2006 | Schmeidler et al. | |
| 7,028,305 B2 | 4/2006 | Schaefer | |
| 7,200,632 B1 | 4/2007 | Greschler et al. | |
| 7,225,264 B2 | 5/2007 | Croman et al. | |
| 7,426,661 B2 | 9/2008 | Schaefer | |
| 7,451,451 B2 | 11/2008 | Schaefer | |
| 7,590,743 B2 | 9/2009 | Willis | |

(Continued)

FOREIGN PATENT DOCUMENTS

CN 1816192 A 8/2006

OTHER PUBLICATIONS

"International Search Report", Mailed Date: Jul. 27, 2012, Application No. PCT/US2011/066153, Filed Date: Dec. 20, 2011, pp. 8.

(Continued)

*Primary Examiner* — Anthony Brown
(74) *Attorney, Agent, or Firm* — Nicholas Chen; Kate Drakos; Micky Minhas

(57) ABSTRACT

In order to enable potentially conflicting applications to execute on the same computer, application programming interface (API) calls are intercepted when an application attempts to access a computer system's resources. During a learning mode of operation, a security monitor stores data in a security monitor database identifying which applications are allowed to access the computer system resources. At runtime of an application, the security monitor operates in an enforcement mode and utilizes the contents of the security monitor database to determine if an application is permitted to access system resources. If data associated with the application is located in the security monitor database, the application is allowed to access computer system resources, if data associated with the application is not located in the security monitor database, the application is not allowed to access computer system resources.

16 Claims, 6 Drawing Sheets

(56) References Cited

U.S. PATENT DOCUMENTS

| | | | |
|---|---|---|---|
| 7,690,039 | B2 | 3/2010 | Schmeidler et al. |
| 7,707,641 | B2 | 4/2010 | Schmeidler et al. |
| 7,730,169 | B1 | 6/2010 | Greschler et al. |
| 7,797,372 | B2 | 9/2010 | Greschler et al. |
| 2007/0294699 | A1 | 12/2007 | Bahl et al. |
| 2008/0052762 | A1* | 2/2008 | Hemsath et al. ............... 726/2 |
| 2009/0228950 | A1 | 9/2009 | Reed et al. |
| 2009/0271844 | A1* | 10/2009 | Zhang et al. ............... 726/2 |
| 2009/0313699 | A1 | 12/2009 | Jang et al. |
| 2010/0050257 | A1 | 2/2010 | Jin |
| 2010/0077473 | A1 | 3/2010 | Ohta et al. |
| 2010/0275025 | A1* | 10/2010 | Parkinson ............... 713/176 |

OTHER PUBLICATIONS

"IBM Power Edge of Network Processor", Retrieved at << http://www.power.org/resources/downloads/PowerEN__Affinity__Whitepaper__Final.pdf >>, Jul. 2010, pp. 8.

"Effective Enterprise Java Virtualization with Oracle WebLogic Suite", Retrieved at << http://www.oracle.com/us/products/middleware/application-server/wls-virtualization-twp-067890.pdf >>, Apr. 2010, pp. 14.

"Dynamic Data Center Challenges", Retrieved at << http://h10147.www1.hp.com/docs/datacenter/Data__Center__Provisioning__Automation__White__Paper__Jan__09__WW__Eng__Ltr.pdf>>, Jan. 2009, pp. 1-8.

"Red Hat and Cisco Expand Relationship with Virtualization Technology Integration", Retrieved at << http://www.virtualization.net/544-red-hat-cisco-virtualization-technology-integration/ >>, Jun. 24, 2010, pp. 7.

"Determine True Total Cost of Ownership", Retrieved at << http://www.vmware.com/technical-resources/advantages/virtual-machine-density.html >>, Retrieved Date: Oct. 15, 2010, pp. 2.

"Snapshot Director for VMware", Retrieved Oct. 15, 2010 at << http://www.falconstor.com/tk.php?tk=3Z18DEF34F7873223089B0D956F6EBD8&gk=MTI4NzEyMDg1OQ==>>, pp. 1-2.

"Next-Generation Federal Data Center Architecture", Retrieved at << http://www.cisco.com/en/US/solutions/collateral/ns340/ns517/ns224/net__implementation__white__paper0900aecd805fbdfd.html >>, Retrieved Date: Oct. 15, 2010, pp. 8.

"Cloud Switch Architecture Overview", Retrieved Oct. 15, 2010 at << http://www.vmware.com/appliances/directory/uploaded__files/va/10/08/05/CloudSwitch%20Architecture%20Overview%200410.pdf >>, pp. 3.

Chinese Official Action dated May 21, 2014 in Chinese Application No. 201110430834.2.

Chinese Notice of Allowance dated Jul. 30, 2014 in Chinese Application No. 201110430834.2.

Chinese Official Action dated Jan. 16, 2014 in Chinese Application No. 20110430834.2.

Chinese Official Action dated Feb. 20, 2014 in Chinese Application No. 20110430834.2.

* cited by examiner

PROVIDING A SECURITY BOUNDARY

BACKGROUND

Data center administrators face a challenging task to fulfill the data requirements of a datacenter, while also maintaining acceptable power, hardware, and space requirements. Often, in order to minimize expenditures, administrators increase the application density of servers within a datacenter. Application density is a measure of the number of applications executing on a single physical computer. By increasing the number of applications running on each physical computer, the number of servers required to support data center operations may be minimized.

In order to increase application density within a datacenter, administrators may also utilize virtual machines (VMs). Virtual machines can increase application density by enabling the sharing of a machine's physical resources by multiple virtual machines. For various reasons, however, it is not always possible to execute two different applications within the same VM. For instance, it may be undesirable for two different applications to execute within the same VM due to security concerns. As another example, two different applications executing on the same VM might conflict when attempting to access the same resource.

In order to enable two potentially conflicting applications to execute on the same computer, it might be necessary to execute an individual VM for each application. However, it can be costly to execute multiple VMs in this manner due to the licensing costs associated with executing each virtual machine. In addition, performance cost for executing multiple VMs can be significant when operating in an environment containing a large number of machines, for example, operating in a cloud environment. Within a data center each VM is typically monitored and managed. Accordingly, the management cost for operating a data center increases with the addition of VMs because each VM may require various patches or policies in order to operate in a desired fashion.

It is with respect to these and other considerations that the disclosure made herein is presented.

SUMMARY

Concepts and technologies are disclosed herein for providing a security boundary. Through an implementation of the concepts and technologies presented herein, multiple applications can be executed on the same computer in a manner that provides a secure boundary between the applications. In this manner, two or more applications may be executed on the same physical or virtual computer for which it might otherwise be undesirable or impossible. Consequently, the technologies disclosed herein may be utilized to reduce the number of VMs, and the associated licensing fees, required to execute incompatible or conflicting applications.

According to one aspect presented herein, a security monitor executes in a learning mode to monitor application programming interface (API) calls made by executing applications to identify the resources that are used by the application. The security monitor adds an editable virtual access control list (ACL) for each of the identified resources to a security monitor database that may be used to control access to each identified system resource ranging from complete access to off limits. Once the security monitor has identified the resource accessed by an API call, the security monitor allows the API call to proceed as normal.

In an enforcement mode of operation, the security monitor monitors API calls made by executing applications to determine whether the applications are authorized to access system resources. In particular, when the security monitor is in the enforcement mode, the security monitor intercepts the API calls made by an application. The security monitor then accesses the security monitor database to determine if the requesting application is authorized to access the requested system resources. If the security monitor determines that the application is authorized to access the requested system resources, then the API call is allowed to proceed as normal. If the security monitor determines that the application is not authorized to access the requested system resources, the security monitor denies access to the system resources by the application. A system administrator may edit an ACL to allow a denied application access to the requested systems resources.

It should be appreciated that the embodiments disclosed herein may be utilized in conjunction with virtualized applications, non-virtualized applications executing in a hardware virtualized environment, non-virtualized applications executing in a non-virtualized environment, and other types of applications. It should also be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
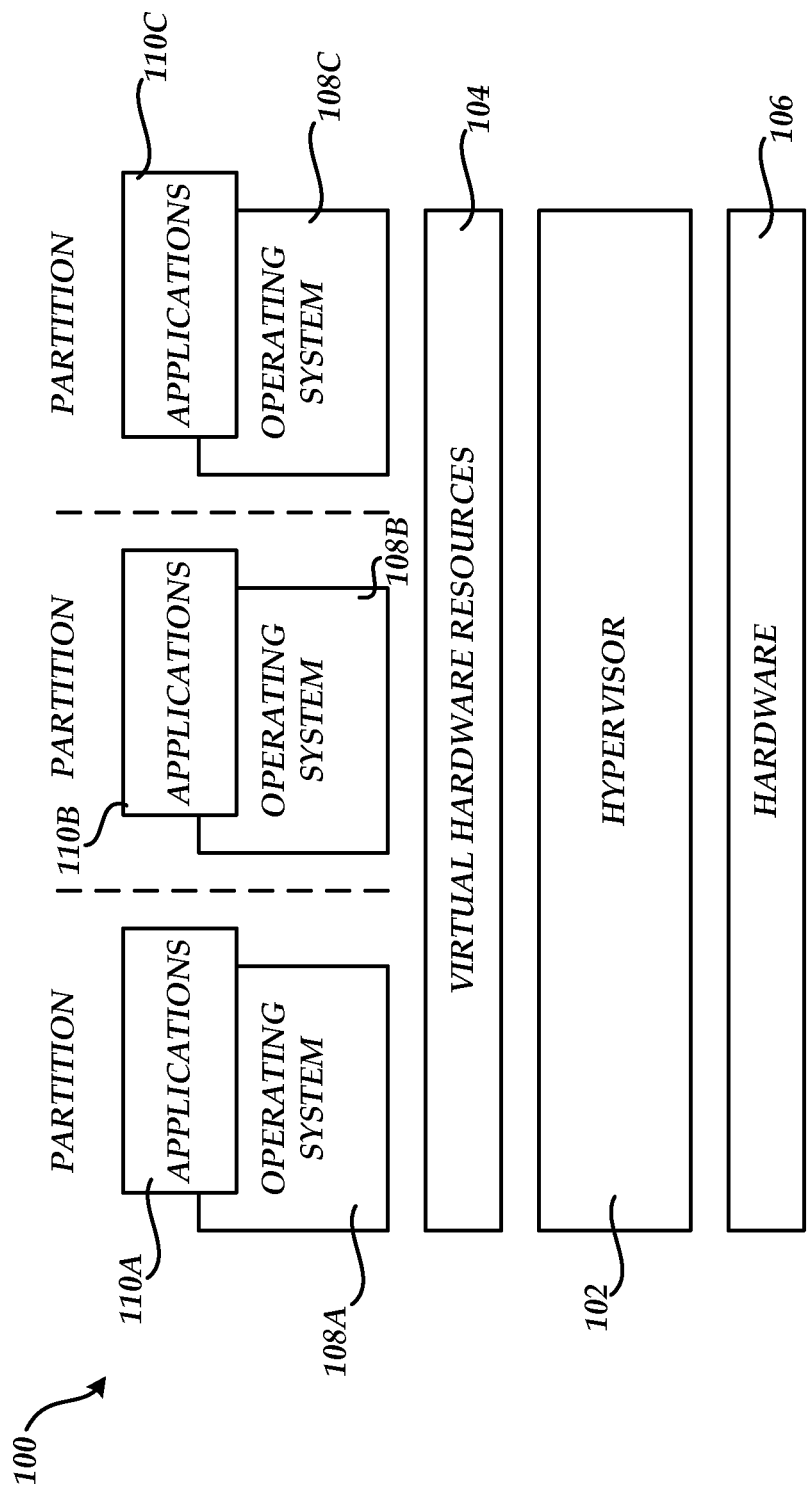
FIG. 1 is a computer software architecture diagram that illustrates an example of a suitable computing environment in which aspects of the subject matter described herein may be implemented.

The following detailed description is directed to technologies for providing a security boundary. As discussed briefly above, and described in greater detail below, a learning mode of operation is executed in which application API calls are intercepted. Data identifying the API calls is recorded in a security monitor database. At a run time of the application, a security monitor allows the applications to access resources based on the data stored in the database during the learning mode of operation. Additional details regarding these processes will be provided below with regard to FIGS. 1-6.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for providing a security boundary will be presented.

FIG. 1 is a computer software architecture diagram that illustrates an example of a suitable computing environment 100 in which aspects of the subject matter described herein may be implemented. In particular, FIG. 1 shows an illustrative software architecture for implementing a hardware virtualized computing environment. As known in the art, virtualization allows a host computer to concurrently run multiple operating systems on a single computer. Each executing instance of an operating system is typically referred to as a virtual machine.

In order to enable the execution of virtual machines, a software hypervisor 102 may be executed to provide functionality for configuring, executing, and managing the operation of virtual machines. The hypervisor 102 is a layer of software that runs above the physical hardware 106 of the host computer upon which it executes, and below one or more operating systems 108A-108C. The hypervisor 102 might also be implemented in hardware.

The hypervisor 102 provides isolated execution environments called partitions. In the example shown in FIG. 1, the operating system 108A and the applications 110A are executing in a first partition, the operating system 108B and the applications 110B are executing in a second partition, and the operating system 108C and the applications 110C are executing in a third partition. The hypervisor 102 provides each partition with its own set of virtual hardware resources 104 (for example, memory, devices, and central processing unit ("CPU") cycles). The hypervisor 102 also controls and arbitrates access to the underlying hardware 106 as needed.

As will be described in greater detail below, the hypervisor 102 might implement the functionality disclosed herein for providing a security boundary to provide a security boundary between applications 110 executing within the same partition by assigning an access control list (ACL) to each system resource and assigning permissions to use each system resource based on a permission list containing applications 110 allowed to use the system resources. In other embodiments, the functionality presented herein might be implemented within an operating system 108, or by an application program that installs low-level operating system drivers to enable the functionality disclosed herein. In this regard, it should be appreciated that FIG. 1 is merely illustrative and that the embodiments presented herein might be utilized within many different types of virtualization environments that have been implemented in many different ways. For instance, the embodiments disclosed herein may be utilized in conjunction with virtualized applications, non-virtualized applications executing in a hardware virtualized environment, non-virtualized applications executing in a non-virtualized environment, and other types of applications.

Figure 2:
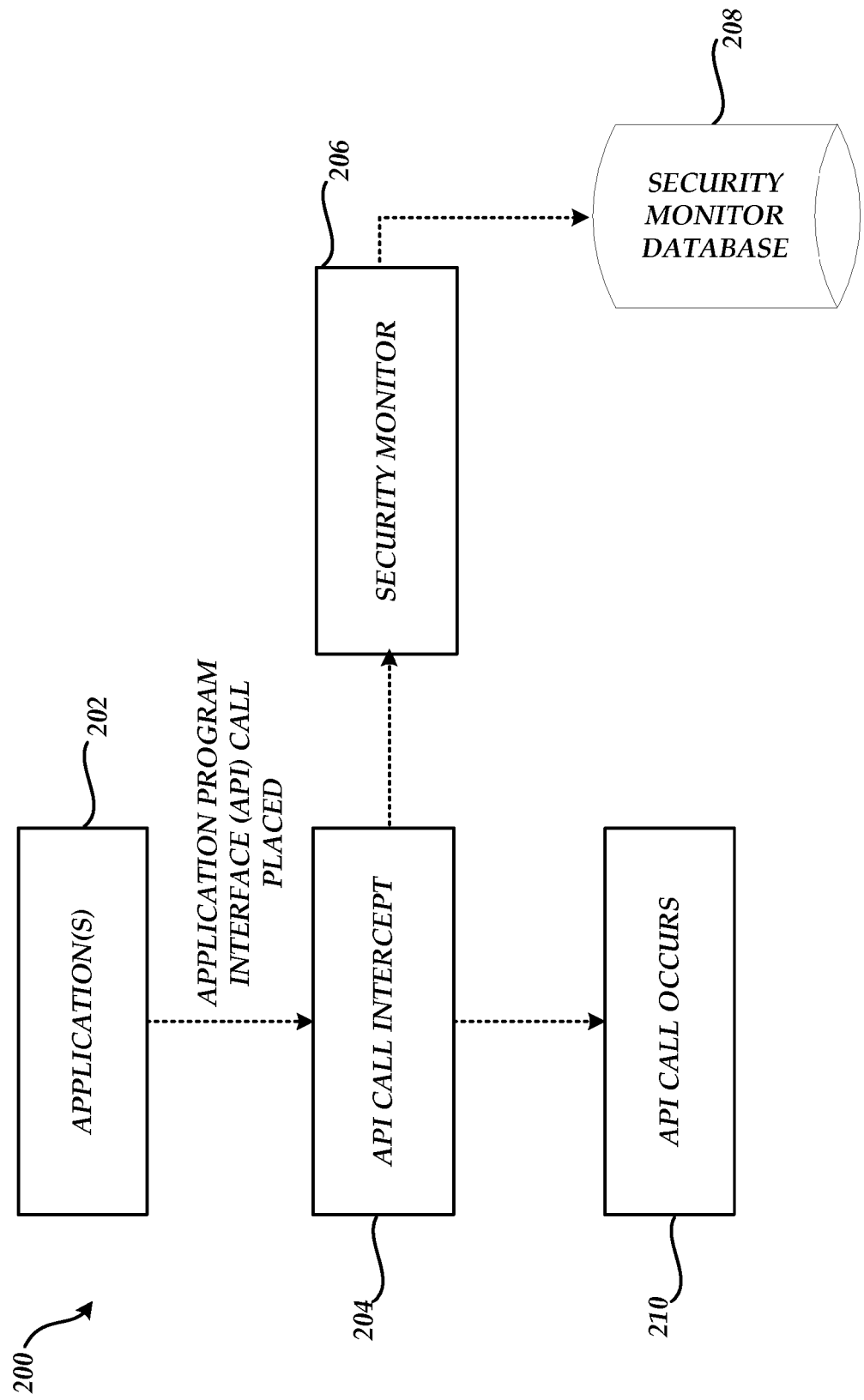
FIG. 2 is a computer software architecture diagram that illustrates aspects of a security monitor operating in a learning mode provided herein for providing a security boundary according to various embodiments presented herein.

FIG. 2 is a computer software architecture diagram that illustrates a software environment 200 in which a security monitor 206 is executing in a learning mode of operation (the "learning mode"). In the software environment 200 shown in FIG. 2, one or more applications 202 are executing on a computer, such as a server computer, a standard desktop or laptop computer, or a table computer. For example, the applications 202 may include a human resource (HR) application, an accounting application, a structured query language (SQL) server, and the like.

During execution, the applications 202 may place one or more application programming interface (API) calls in order to facilitate communications with other programs and access system resources. It should be appreciated that, as used herein, the term "system resources" encompasses all resources or objects for which an operating system (OS) does not otherwise control access for use. For instance, system resources may include network endpoints, network ports, files, windows, user interface (UI) elements, a registry, open database connectivity (ODBC) connection strings, and other types of resources.

While in learning mode, the security monitor 206 intercepts the API calls made by the applications 202. This is illustrated in FIG. 2 as the block 204. In response to intercepting an API call, the security monitor 206 associates one or more editable ACLs with the system resources that are the target of the API call. The one or more editable ACLs may be used to control access to the system resources ranging from complete access to the system resources to off limits, in one embodiment, the security monitor 206 stores the one or more ACLs in a security monitor database 208. The metadata may include data identifying the system resource requested by the application 202 and an indication that the application 202 is permitted to access the resources. After the ACLs are stored in the security monitor database 208, the intercepted API calls are allowed to proceed as normal. This is illustrated at block 210 shown in FIG. 2.

As will be described in greater detail below, the security monitor 206 utilizes the contents of the security monitor database 208 at runtime of the applications 202 to allow or deny access to system resources. In particular, the security monitor 206 will permit API calls to access resources by applications 202 that have been processed by the learning mode described above. API calls to access system resources by applications 202 that have not been processed in the learning mode described above will not be permitted. In this regard, the data stored by the security monitor 206 in the security monitor database 208 is utilized as a whitelist. An administrator may allow or deny access to system resources after the learning mode has occurred by editing the whitelist to add or remove applications, for example, applications 202. It should be appreciated, therefore, that the type of data stored in the security monitor database 208 described above is merely illustrative and that the security monitor may store other types of data.

Figure 3:
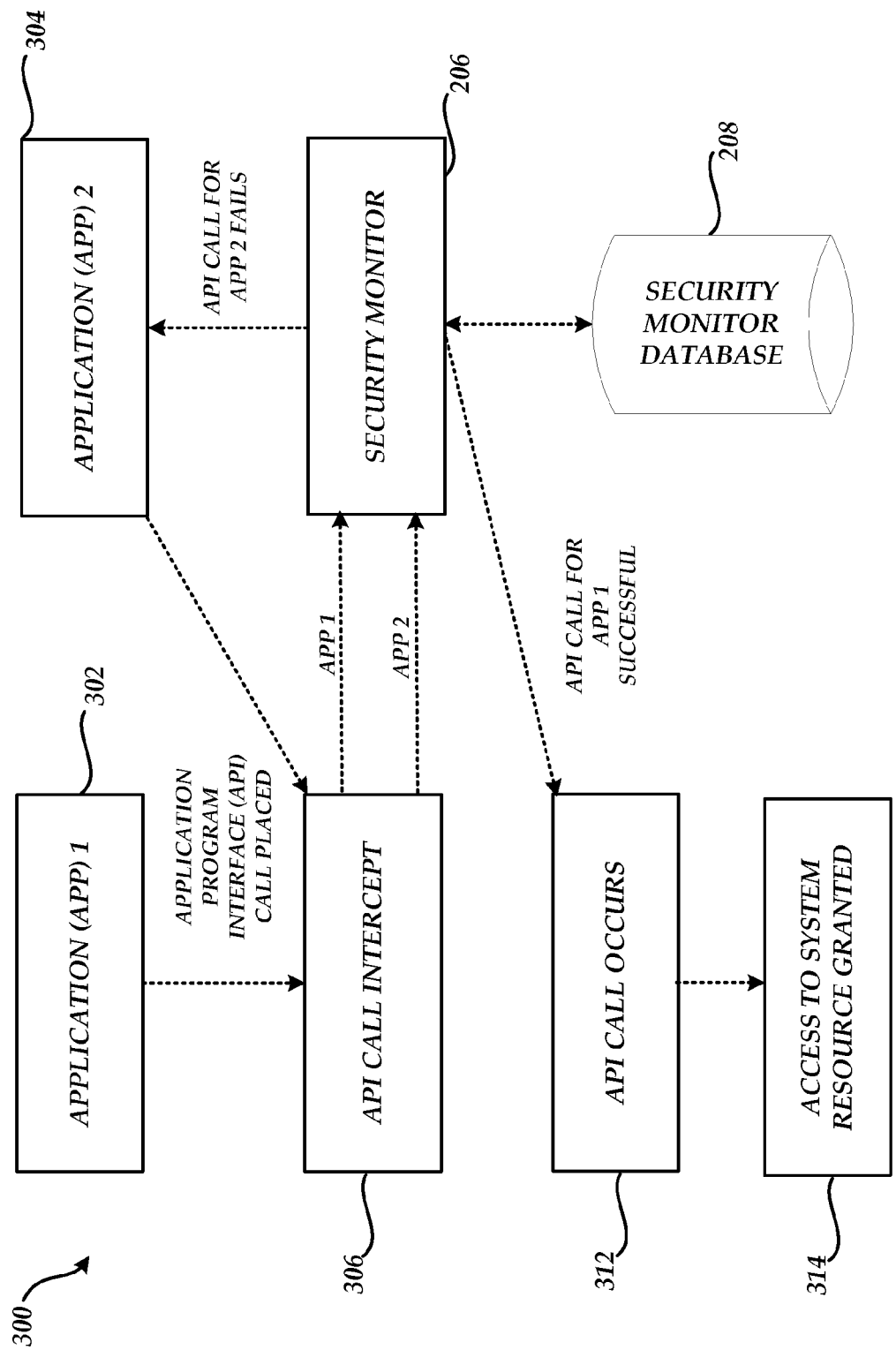
FIG. 3 is a computer software architecture diagram that illustrates aspects of a security monitor operating in an enforcement mode at run time according to various embodiments presented herein.

FIG. 3 is a computer software environment 300 in which the security monitor 206 is executing in an enforcement mode of operation (the "enforcement mode"). The environment 300 includes application 302 and an application 304 executing on the same computer. While application 302 and application 304 are running on the server, these applications may place one or more API calls in order to facilitate communications with other programs and to access system resources.

In the example shown in FIG. 3, the security monitor 206 has processed the application 302 in the learning mode described above. The application 304 has not, however, been executed in the learning mode. Consequently, the security monitor database 208 includes data identifying the API calls made by the application 302. The security monitor database 208 does not contain data identifying API calls made by the application 304.

While in the enforcement mode, the security monitor 206 intercepts API calls made by the application 302 and application 304. This is represented in FIG. 3 by the block 306. In response to intercepting the API calls, the security monitor 206 accesses the contents of the security monitor database 208 to determine if the API calls should be permitted. For instance, in one implementation, the security monitor 206 accesses ACLs and metadata stored during learning mode to determine if the API calls made by the application 302 and the application 304 should be permitted.

Because the application 302 has been processed in the learning mode, the security monitor 206 determines that application 302 is authorized to access the requested system resources. Because application 302 is authorized to access system resources, the intercepted API call made by application 302 is allowed to proceed as normal. This is illustrated in the blocks 312 and 314 in FIG. 3. Because the application 304 has not been executed in the learning mode, the security monitor 206 also determines that the application 304 is not authorized to access the system resources. Because application 304 is not authorized to access system resources, the intercepted API call made by application 304 is not permitted to proceed.

Figure 4:
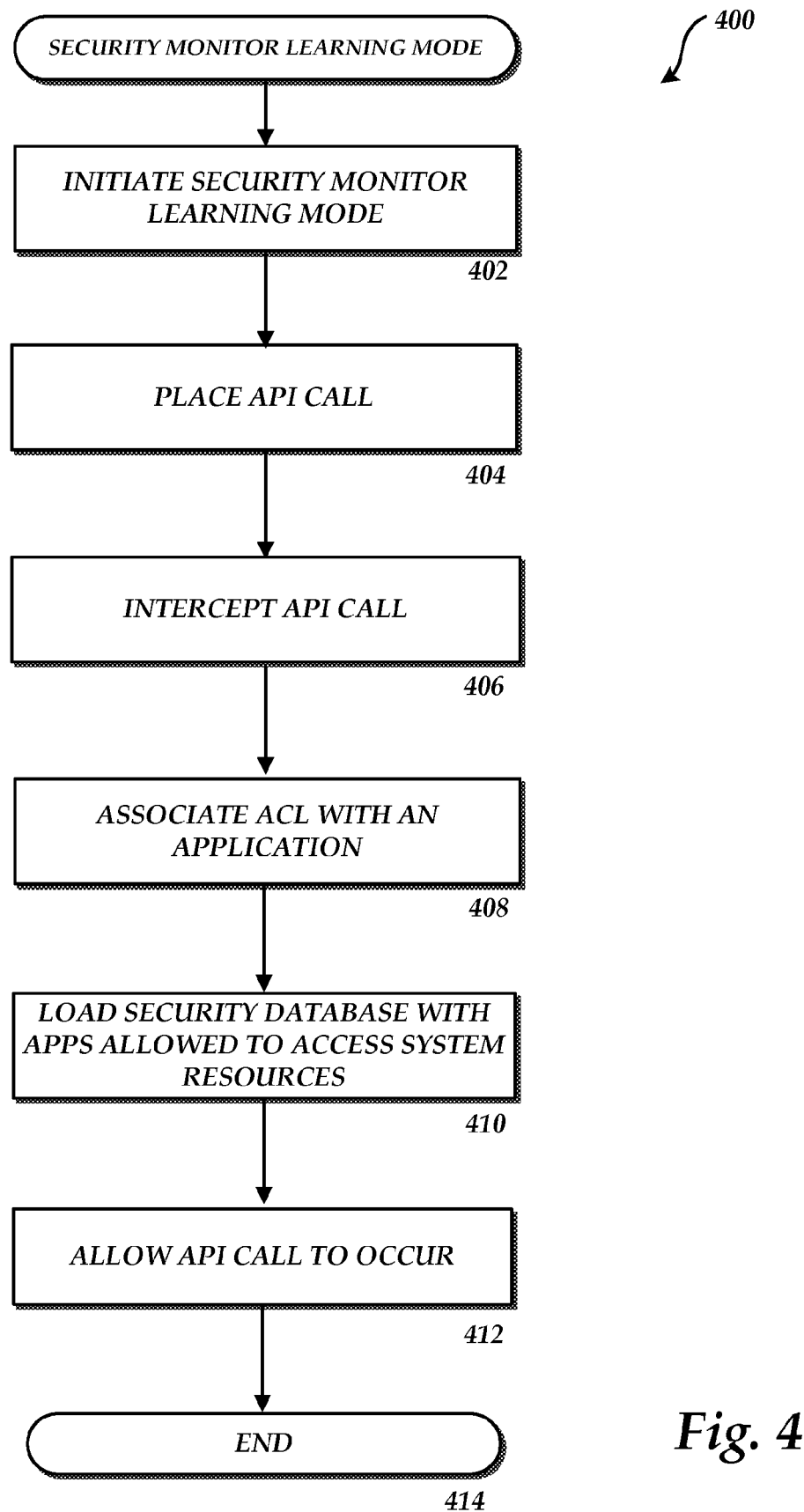
FIG. 4 is a flow diagram showing aspects of one illustrative routine provided herein for monitoring systems resource access when the security monitor is in a learning mode.

FIG. 4 is a flow diagram showing a routine 400 that illustrates aspects of the operation of the security monitor 206 operating a learning mode. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or fewer operations may be performed than shown in the FIGURES and described herein. These operations may also be performed in a different order than those described herein.

The routine 400 begins at operation 402 where an administrator executes the security monitor 206 in the learning mode. Once the security monitor 206 has begun executing, the routine 400 proceeds to operation 404, where the applications running on the computer initiate API calls. From operation 404, the routine proceeds to operation 406.

At operation 406, the security monitor 206 intercepts the API calls initiated by the one or more applications. In response to intercepting an API call, the routine 400 proceeds to operation 408, where the security monitor 206 adds the application making the API call to an ACL associated with the requested resource. An administrator might also be permitted to specify that an application can access the resources by modifying the ACLs. From operation 408, the routine 400 proceeds to operation 410.

At operation 410, the one or more ACLs are stored in the security monitor database 208. Once the security monitor 206 has updated the security monitor database 208, the routine 400 proceeds to operation 412 where the intercepted API calls are allowed to proceed as normal. From operation 412, the routine 400 proceeds to operation 414, where it ends.

Figure 5:
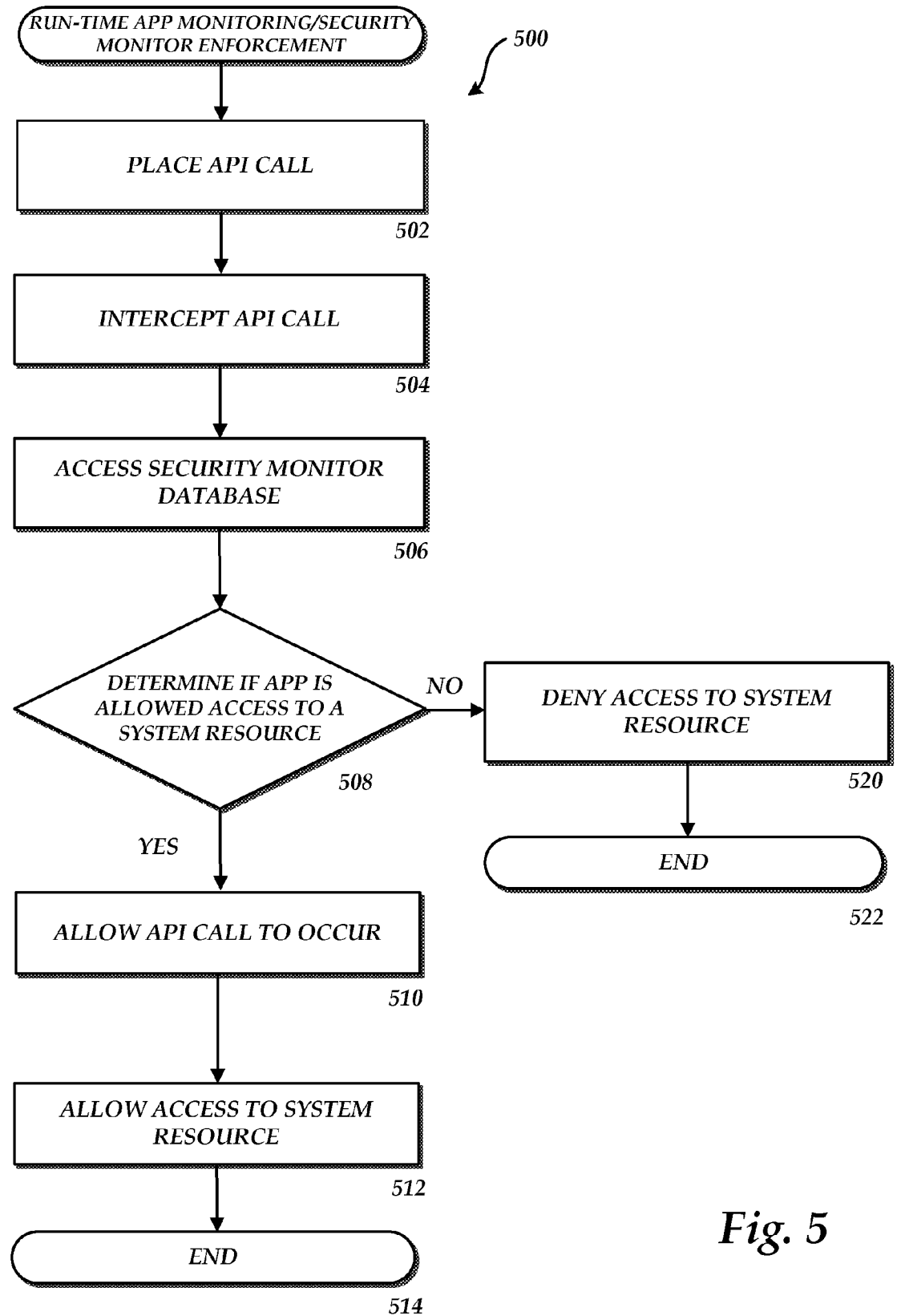
FIG. 5 is a flow diagram showing aspects of one illustrative routine provided herein for monitoring system resource access when the security monitor operates in an enforcement mode.

FIG. 5 is a flow diagram showing a routine 500 that illustrates aspects of the operation of the security monitor 206 operating in the enforcement mode. The routine 500 begins at operation 502, where the one or more applications initiate API calls in the manner described above. In response thereto, the security monitor 206 intercepts the API calls initiated by the applications at operation 504.

At operation 506, the security monitor 206 accesses the security monitor database 208. The security monitor 206 then determines, using the data stored in the security monitor database 208, whether the application initiating the API call are authorized to access the requested system resources. This occurs at operation 508.

If the security monitor 206 determines that an application is authorized to access the requested system resource, the routine proceeds to operation 510 where the server allows the API call to proceed as normal. At operation 512, the application 302 is the permitted access to the requested resource. From operation 512, the routine 500 proceeds to operation 514, where it ends.

If, at operation 508, the security monitor 206 determines that the application 304 is not authorized to access the requested system resource, the routine proceeds to operation 521) where the server prevents the API call made by application 304 from executing. From operation 520, the routine 500 proceeds to operation 522, where it ends.

It should be appreciated that the security monitor 206 may store information relating to failed API calls. This information may be provided to an administrator by way of a suitable user interface. The administrator may use this data to determine whether the application making the failed API call should be allowed to access certain system resources. In this regard, the administrator may modify the data (e.g. an ACL) stored in the security monitor database 208 to permit execution of an API call by the application during a future execution.

Figure 6:
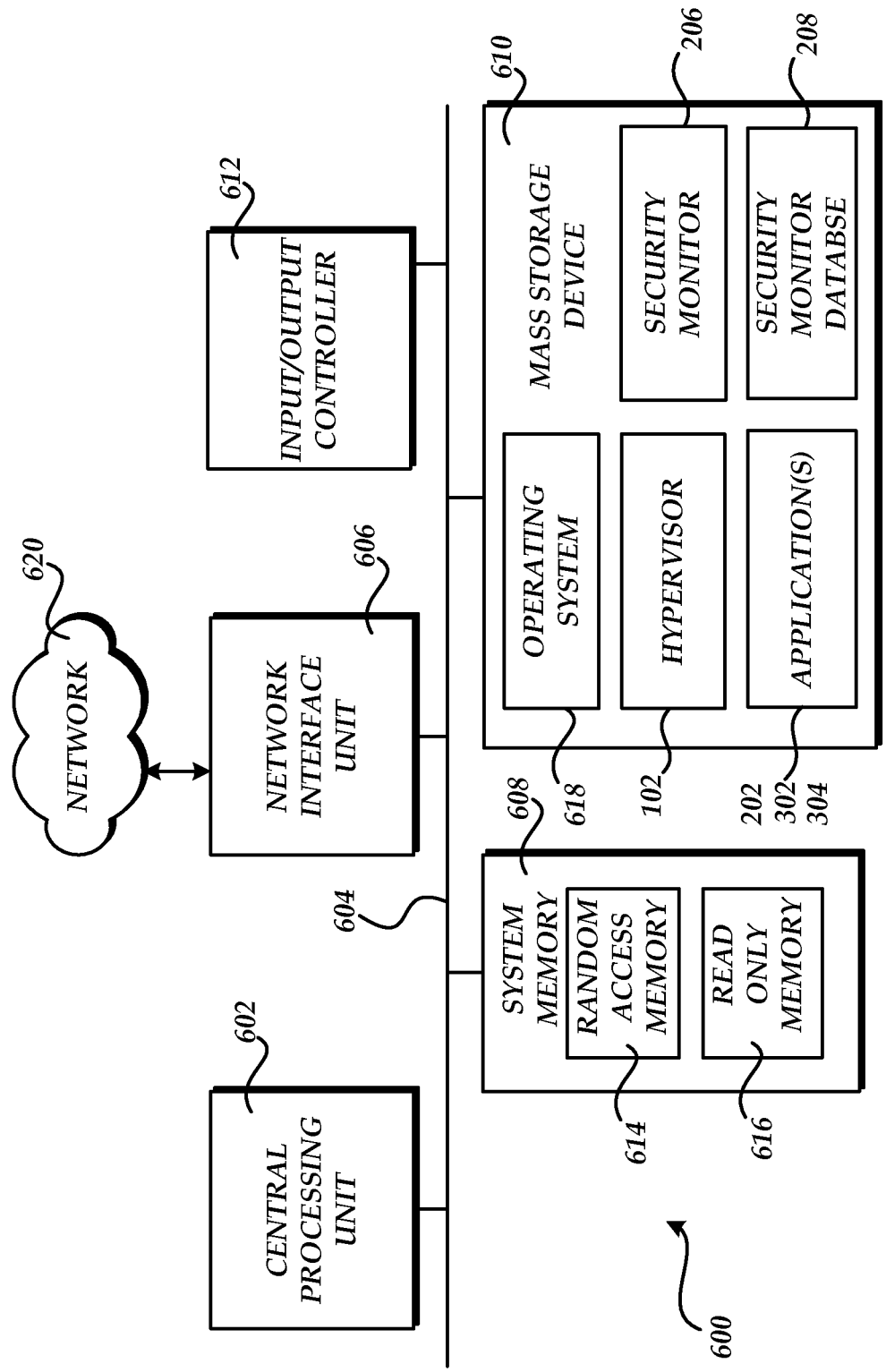
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for providing a security boundary. The computer architecture shown in FIG. 6 illustrates a conventional desktop, laptop, or server computer and may be utilized to execute any aspects of the software components presented herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the hypervisor 102, applications 202 302 and 304, the security monitor 206, and the security monitor database 208, each of which was described in detail above with respect to FIGS. 1-5. The mass storage device 610 and the RAM 614 may also store other types of program modules and data.

It should be appreciated that the software components described herein may, when loaded into the CPU 602 and executed, transform the CPU 602 and the overall computer 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the computer 600 may comprise other types of computing devices, including hand-held computers, embedded computer systems, personal digital assistants, and other types of computing devices known to those skilled in the art. It is also contemplated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for providing a security boundary are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is defined by the claims set forth below.

What is claimed is:

1. A computer-implemented method for providing a security boundary, the computer-implemented method comprising performing computer-implemented operations for:

executing, by a computer, a security monitor in a learning mode of operation wherein the security monitor performs operations for intercepting by way of the security monitor one or more application programming interface (API) calls placed by an application for accessing one or more system resources, storing data in a security monitor database associated with accessing the system resources, associating one or more access control lists (ACLs) with the system resources requested when intercepting the API calls to be used by the application, and loading the security monitor database with the one or more ACLs; and executing the security monitor in an enforcement mode of operation wherein the security monitor performs operations for determining by way of the security monitor at a runtime of the application whether the application placing the one or more API calls is authorized to access the system resources, allowing the application access to the system resources when data associated with the application is located in the security monitor database, and preventing the application access to the system resources when data associated with the application is not located in the security monitor database.

2. The computer-implemented method of claim 1, further comprising providing data related to the application prevented access to the system resources to an administrator.

3. The computer-implemented method of claim 1, wherein the application is a virtual application.

4. The computer-implemented method of claim 3, wherein the virtual application is running on a single physical machine on which other virtual applications are running.

5. The computer-implemented method of claim 4, wherein the virtual application and other virtual applications are executed within a partition.

6. The computer-implemented method of claim 1, wherein the system resource comprises at least one of a communications port, a registry, an open database connectivity connection string, or an endpoint.

7. An optical disk, a magnetic storage device, or a solid state storage device having computer-readable instructions stored thereupon which, when executed by a computer, cause the computer to:

execute a security monitor in a learning mode of operation, wherein when in the learning mode of operation, the security monitor intercepts by way of a security monitor one or more application program interface (API) calls placed by an application for accessing one or more system resources, stores data related to the API calls in a security monitor database, associates one or more access control lists (ACLs) with the system resources requested when intercepting the API calls to be used by the application, and loads the security monitor database with the one or more ACLs;

execute the security monitor in an enforcement mode of operation, wherein when in the enforcement mode of operation, the security monitor isolates one or more other applications from accessing the system resources based on the data stored in the security monitor database, allows the application access to the system resources when data associated with the application is found in the security monitor database, and prevents the application from accessing the system resources when data associated with the application is not found in the security monitor database.

8. The optical disk, the magnetic storage device, or the solid state storage device of claim 7, having further computer-executable instructions stored thereon which, when executed by the computer, cause the computer to:

provide a security monitor within a virtualization layer; and associate one or more access control lists (ACLs) with the system resources.

9. The optical disk, the magnetic storage device, or the solid state storage device of claim 7 further comprising providing data related to the application prevented from accessing the system resources to an administrator.

10. The optical disk, the magnetic storage device, or the solid state storage device of claim 9, wherein the administrator can allow access to the system resources to the application prevented from accessing the system resources.

11. The optical disk, the magnetic storage device, or the solid state storage device of claim 7, wherein the application is a virtual application.

12. The optical disk, the magnetic storage device, or the solid state storage device of claim 11, wherein the virtual application is running on a single physical machine on which other virtual applications are running.

13. The optical disk, the magnetic storage device, or the solid state storage device of claim 12, wherein the system resources are hidden from the other virtual applications running on the single physical machine using namespace hiding.

14. The optical disk, the magnetic storage device, or the solid state storage device of claim 13, wherein the system resource comprises at least one of a communications port, a registry, an open database connectivity connection string, or an endpoint.

15. A computer-implemented method for providing a security boundary, the computer-implemented method comprising performing computer-implemented operations for:

executing, by a computer, a security monitor in a learning mode of operation during which application programming interface (API) calls placed by an application for accessing a system resource are intercepted and access control lists (ACLs) associated with the system resource are stored in a security monitor database; and executing the security monitor in an enforcement mode of operation during which application programming interface (API) calls placed by the application are intercepted and a determination of whether ACLs associated with the application are stored in the security monitor database, wherein the application is authorized to access system resources when ACLs associated with the application are stored in the security monitor database, and the application is not authorized to access system resources when ACLs associated with the application are not stored in the security monitor database.

16. The computer-implemented method of claim 15, wherein the application comprises a virtual application and wherein the system resource comprises at least one of a communications port, a registry, an open database connectivity connection string, or an endpoint.

* * * * *